United States Patent [19]

Mayer et al.

[11] Patent Number: 4,757,106

[45] Date of Patent: Jul. 12, 1988

[54] AQUEOUS ORGANOPOLYSILOXANE EMULSIONS

[75] Inventors: Hans Mayer, Burghausen; Hermann Wilhelm, Braunau; Bernward Deubzer, Burghausen, all of Fed. Rep. of Germany

[73] Assignee: Wacker-Chemie GmbH, Munich, Fed. Rep. of Germany

[21] Appl. No.: 19,988

[22] Filed: Feb. 27, 1987

[30] Foreign Application Priority Data

Apr. 21, 1986 [DE] Fed. Rep. of Germany ....... 3613384

[51] Int. Cl.⁴ .............................................. C08K 5/24
[52] U.S. Cl. .................................... 524/262; 524/501; 524/506; 524/730; 524/731; 106/287.11; 106/287.14; 106/287.16
[58] Field of Search ............... 524/262, 731, 501, 506, 524/730; 106/287.11, 287.14, 287.16

[56] References Cited

U.S. PATENT DOCUMENTS 4,288,356 9/1981 Huebner et al. ................... 524/501
4,657,959 4/1987 Bryan et al. ........................ 524/731
4,661,551 4/1987 Mayer et al. ........................... 528/12

Primary Examiner—Melvyn I. Marquis

[57] ABSTRACT

Aqueous emulsions of (A) an organopolysiloxane comprising aliphatic radicals that are bonded to silicon via oxygen which have a molecular weight of at least 620 g/mol, and (B) an emulsifier containing a salt of a water-soluble organic or inorganic acid and a polysiloxane which contains siloxane units having monovalent SiC-bonded radicals with basic nitrogen, in which the basic nitrogen is present in an amount of at least 0.5 percent by weight based on the weight of the polysiloxane, and not more than 5 percent by weight of a water-soluble solvent or octanols, based on the weight of the emulsifier (B).

These emulsions may be used to impart hydrophobic properties to mineral substances by applying the emulsions to the mineral substances after they have been molded. These emulsions may also be used to impart hydrophobic properties to inorganic binding agents or they may be used as binding agents for inorganic fibrous materials or as binding agents in aqueous paints.

4 Claims, No Drawings

AQUEOUS ORGANOPOLYSILOXANE EMULSIONS

The present invention relates to aqueous emulsions and more particularly to aqueous organopolysiloxane emulsions.

BACKGROUND OF THE INVENTION

Organopolysiloxane compositions which form transparent mixtures when diluted with water are described in European Patent Application No. 0 068 671 to Dow Corning Limited. These compositions contain a salt of a water-soluble organic or inorganic acid and an organopolysiloxane, which in addition to the other siloxane units, also contains siloxane units containing SiC-bonded radicals having basic nitrogen atoms, methyltrimethoxysilane, a silicon compound which is soluble in such a salt and a water-soluble solvent.

Also, U.S. Pat. No. 4,661,551 to Mayer et al describes an aqueous transparent composition containing (A) a salt of a water-soluble organic or inorganic acid and a polysiloxane in which the polysiloxane contains, in addition to other siloxane units, siloxane units containing monovalent SiC-bonded radicals having basic nitrogen in an amount of at least 0.5 percent by weight of basic nitrogen, based on the weight of the polysiloxane; (B) an organosilicon compound containing basic nitrogen in an amount of from 0 to 0.5 percent by weight, based on the weight of the organic silicon compound, and when constituent (B) is present in an amount less than 0.1 part by weight per part by weight of constituent (A), then constituent (B) contains at least one organic silicon compound having a molecular weight which does not exceed 600 g per mol and (C) an organic solvent including octanols which may be present in an amount up to about 5, percent by weight based on the weight of constituent (A), in which the organic solvent is soluble in water up to and including one part by weight per 100 parts by weight of water at 20° C. and 1020 hPa (absolute) and is free of halogen atoms.

The organosilicon compound (B) may consist of an organopolysiloxane containing aliphatic radicals which are bonded to silicon via oxygen and which have a molecular weight of approximately 600 g per mol.

Therefore, it is an object of the present invention to provide organopolysiloxane emulsions which form transparent compositions when diluted with water. Another object of the present invention is to provide aqueous organopolysiloxane emulsions containing aliphatic radicals that are bonded to silicon via oxygen and which have a molecular weight of at least 620 g per mol and which may be free of an organic solvent which is water-soluble up to and including one part by weight per 100 parts by weight of water at 20° C. and at 1020 hPa (absolute), and is free of halogen atoms. Still another object of the present invention is to provide an aqueous organopolysiloxane emulsion which has a very long shelf life without any sign of demulsification, when used as an impregnating agent. A further object of the present invention is to provide aqueous organopolysiloxane emulsions which are highly compatible with other resins. A still further object of the present invention is to provide aqueous organopolysiloxane emulsions which have adequate crosslinking and form clear, highly water-resistant films.

SUMMARY OF THE INVENTION

The foregoing objects and others which will become apparent from the following description are accomplished in accordance with this invention, generally speaking, by providing an aqueous emulsion containing (A) an organopolysiloxane having aliphatic radicals which are bonded to silicon via oxygen and which have a molecular weight of at least 620 g per mol, (B) an emulsifier containing a salt of a water-soluble organic or inorganic acid and a polysiloxane containing, in addition to other siloxane units, siloxane units containing monovalent SiC-bonded radicals having a basic nitrogen in an amount of at least 0.5 percent by weight of basic nitrogen, based on the weight of the polysiloxane, in which the aqueous emulsions do not contain any water-soluble solvent or octanols in an amount greater than 5 percent by weight, based on the weight of the emulsifier (B).

DESCRIPTION OF THE INVENTION

The organopolysiloxanes (A), having aliphatic radicals which are bonded to silicon via oxygen and a molecular weight of at least 620 g per mol, may be the same organopolysiloxanes having aliphatic radicals that are bonded to silicon via oxygen and having a molecular weight of at least 620 g per mol, which have been or could have been emulsified heretofore in water. The organopolysiloxanes may be represented by the formula

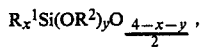

where $R^1$ represents the same or different SiC-bonded monovalent organic radicals, $R^2$ represents the same or different monovalent aliphatic radicals, and $x$ is 0, 1, 2 or 3, with an average of from 0.75 to 1.5, and more preferably from about 0.9 to 1.1, and $y$ is 0, 1, 2 or 3, with an average of from about 0.2 to 2.0 and more preferably from 0.4 to 1.2, with the proviso that these organopolysiloxanes have a molecular weight of at least 620 g per mol.

It is preferred that the organic radicals represented by $R^1$ contain at least 14 carbon atoms per radical. Examples of organic radicals represented by $R^1$ are straight-chain or branched alkyl radicals, such as the methyl, ethyl, n-propyl, isopropyl, n-butyl and the sec-butyl radical, as well as the octyl and tetradecyl radicals; cycloalkyl radicals, such as the cyclohexyl radical and methylcyclohexyl radicals; hydrocarbon radicals having aliphatic carbon-carbon double bonds, such as the vinyl and the allyl radicals; aryl radicals such as the phenyl radical and xenyl radicals; alkaryl radicals, such as the tolyl and xylyl radicals; and aralkyl radicals such as the benzyl radical.

The SiC-bonded organic radicals represented by $R^1$ may, however, also be substituted monovalent hydrocarbon radicals having up to about 14 carbon atoms per radical. Examples of such substituted hydrocarbon radicals are halogenated hydrocarbon radicals, such as the 3,3,3-trifluoropropyl radical and the o-, m- and p-chlorophenyl radicals, and SiC-bonded radicals having carbon, hydrogen, fluorine and etheroxygen atoms as their only atoms, such as the 1,1,2,2-tetrafluoroethoxypropyl and the 1,1,2,2,3,3-hexafluoropropyloxypropyl radical.

Because they are readily available, it is preferred that at least 50 percent of the $R^1$ radicals, i.e., the SiC-bonded organic radicals in the organopolysiloxane (A), be methyl ester radicals. The other organic radicals which may optionally be present in the organopolysiloxane (A) are preferably vinyl or phenyl radicals or mixtures of such radicals.

It is preferred that the $R^2$ radicals contain up to about 4 carbon atoms per radical and that they be alkyl radicals, such as the methyl, ethyl, n-propyl, isopropyl, n-butyl, secbutyl and tert-butyl radical, with the ethyl radical being the preferred radical.

It is preferred that the organopolysiloxanes (A) have a viscosity of from 15 to 2000 mPa.s at 25° C., and more preferably from about 20 to 200 mPa.s at 25° C.

The organopolysiloxane (A) may consist of a single type of organopolysiloxane, or it may consist of a mixture consisting of at least two different types of such organopolysiloxanes.

The organopolysiloxanes (A) are well known in the art and their methods for preparation are well known and described for example in British Pat. No. 685,173 (published 31 Dec. 1951, Dow Corning Limited), U.S. Pat. No. 2,842,521 to Nitzsche et al, French Pat. No. 1,475,709, (published 7 Apr. 1967, General Electric Company), U.S. Pat. No. 3,668,180 to Brennan et al, U.S. Pat. No. 3,792,071 to Nitzsche et al, U.S. Pat. No. 3,846,358 to Roedel, U.S. Pat. No. 4,209,454 to Graf et al, and U.S. Pat. No. 4,298,753 to Schinabeck et al.

Organopolysiloxanes (A) are preferably those obtained from the reaction of methyltrichlorosilane with ethanol and water.

It is preferred that the emulsions of this invention contain the organopolysiloxane (A) in an amount of from 1 to 60 percent by weight, and more preferably in an amount of from 20 to 50 percent by weight, based on the total weight of the emulsion.

The polysiloxanes which are reacted with a water-soluble organic or inorganic acid to form the emulsifier (B) employed in the aqueous organopolysiloxane emulsions of this invention are preferably those consisting of units of the formula $$R_m^1 R_n^3 Si(OR^4)_z O_{\frac{4-m-n-z}{2}}$$

where $R^1$ is the same as above, $R^3$, which may be the same or different is a monovalent SiC-bonded radical having basic nitrogen; $R^4$ is hydrogen or $R^2$; m is 0, 1, 2 or 3, with an average of from 0 to 2 and preferably between 0 and 1.8; n is 0 or 1, with an average of from 0.1 to 0.6, and more preferably from 0.15 to 0.30; z is 0, 1, 2 or 3, with an average of from 0.01 to 0.8 and more preferably from 0.1 to 0.6, and the sum of the average values of m+n+z is no more than 3.4.

The radicals represented by $R^1$ in the emulsifier (B) may be the same radicals as those represented by $R^1$ in the organopolysiloxane (A) and the specific examples of $R^1$ radicals cited in organopolysiloxane (A), also apply to the $R^1$ radicals in the emulsifier (B), except that the phenyl radical is the preferred $R^1$ radical in the emulsifier (B).

The SiC-bonded radicals having basic nitrogen, i.e., the $R^3$ radicals are preferably those of the formula $$R_2^5 NR^6-$$

where $R^5$ represents hydrogen or the same or different alkyl or aminoalkyl radicals and $R^6$ is a divalent hydrocarbon radical.

The alkyl radicals represented by $R^5$, and the divalent hydrocarbon radicals represented by $R^6$, preferably contain up to about 14 carbon atoms per radical. However, it is preferred that at least one hydrogen atom be bonded to each nitrogen atom in the radical of the formula $$R_2^5 NR^6-.$$

Examples of divalent hydrocarbon radicals represented by $R^6$ are the methylene and ethylene radical, as well as the propylene, butylene, cyclohexylene, octadecylene, phenylene and butenylene radicals. The n-propylene radical is the preferred $R^6$ radical because of its availability.

An especially preferred monovalent SiC-bonded radical having basic nitrogen, is the radical of the formula $$H_2N(CH_2)_2NH(CH_2)_3-.$$

Additional examples of SiC-bonded $R^3$ radicals having basic nitrogen are those of the formulas $$H_2N(CH_2)_3-$$

$$H_2N(CH_2)_2-$$

$$H_3CHN(CH_2)_3-$$

$$H_2N(CH_2)_5-$$

$$H(NHCH_2CH_2)_3-$$

$$n\text{-}C_4H_9NH(CH_2)_2NH(CH_2)_3-.$$

The specific examples of the hydrocarbon radicals represented by the $R^2$ radicals in the organopolysiloxane (A) are the same as the aliphatic radicals represented by $R^2$ in the emulsifier (B).

The polysiloxanes, which contain siloxane units having monovalent SiC-bonded radicals with basic nitrogen, may be prepared by conventional methods. For example, they may be prepared by the equilibration or condensation of, for example, gamma-aminoethylaminopropyltrimethoxysilane or gamma-aminoethylaminopropylmethyldimethoxysilane, or mixtures of such silanes and organic polysiloxanes which are free of basic nitrogen. It is preferred that the polysiloxanes have a molecular weight of at least 350 g per mol. These polysiloxanes may, for example, be monoorganopolysiloxanes, e.g., monoalkylpolysiloxanes or monoarylpolysiloxanes, such as those of the following general formulas:

$$CH_3Si(OC_2H_5)_{0.8}O_{1.1}$$

or $$C_6H_5Si(OC_2H_5)_{0.72}O_{1.14}$$

or hydrolysates of isooctyltrichlorosilane, cohydrolysates of phenyltrichlorosilane and n-propyltrichlorosilane, copolymers of monomethylsiloxane and monoisooctylsiloxane units containing methoxy groups, dimethylpolysiloxanes which are end-blocked by trimethylsiloxy groups, dimethylpolysiloxanes containing an Si-bonded hydroxyl group in each of their terminal units, dimethylpolysiloxanes containing as their terminal units those of the formula —Si(CH$_3$)$_2$OR$^2$ where R$^2$ is the same as above, as well as polyethylsilicates where R and copolymers consisting of dimethylsiloxane and monomethylsiloxane units.

The water-soluble organic or inorganic acids used in the preparation of the emulsifier (B) in the aqueous organopolysiloxane emulsions of this invention, may be the same as those which have been or could have been used heretofore in the preparation of a salt of a water-soluble organic or inorganic acid and a polysiloxane containing SiC-bonded radicals with basic nitrogen. Examples of such acids are hydrochloric acid, sulfuric acid, acetic acid, propionic acid and diethylhydrogenphosphate.

Compounds which may be employed as emulsifier (B) in the emulsions of this invention are generally well known and are described, for example, in European Pat. No. 0,068,671; U.S. Pat. Nos. 3,890,269 to Martin; 3,355,424 to Brown; and 4,247,330 to Sanders, Jr.

The term "basic nitrogen", as used in the specification, refers to nitrogen calculated as the element.

It is preferred that emulsifier (B), which consists of a salt of a water-soluble organic or inorganic acid and a polysiloxane, which contains in addition to the other siloxane units, siloxane units having monovalent SiC-bonded radicals with basic nitrogen in an amount of at least 0.5 percent by weight basic nitrogen, based on the weight of the polysiloxane, be present in the emulsion in an amount of from 1 to 30 percent by weight and more preferably from 5 to 20 percent by weight, based on the total weight of the emulsion. Furthermore, it is preferred that the emulsifier (B) be present in the emulsions of this invention in an amount of from 18 to 50 percent by weight, and more preferably from 30 to 50 percent by weight, based on the weight of organopolysiloxane (A).

It is preferred that the aqueous emulsions of this invention be prepared by first mixing the organopolysiloxane (A) with the emulsifier (B), and then emulsifying the mixture in water. The initial mixing and emulsification may take place with the aid of any of the mixing devices generally employed in the preparation of emulsions, such as rapid stator-rotor mixing devices, which are sold under the registered trademark "Ultra-Turrax". Pressurized emulsifiers or colloid mills may also be used.

It is preferred that the emulsions of this invention be free of organic solvents other than water-soluble solvents or octanols; and that these solvents should not be present in an amount greater than about 5 percent by weight based on the weight of the emulsifier (B).

The aqueous organopolysiloxane emulsions of this invention may, for example, be used to impart hydrophobic properties to mineral substances such as building materials, such as for example, roofing tiles, bricks, reinforced or nonreinforced concrete, natural rock, including sandstone, gypsum, slag brick, sandy limestone and asbestos, by applying these emulsions to these building materials after they have been molded, or after additional treatment, for example, after the bricks have emerged from the kiln. The emulsions of this invention may also be applied to building materials after they have been installed in, for example, a building or street.

The aqueous organopolysiloxanes of this invention can also be used as additives to impart hydrophobic properties to inorganic binding agents, such as gypsum, mortar or plaster, concrete, including gas concrete, or limestone, before these building materials are molded, especially by adding the emulsions of this invention to the mixing water.

The aqueous organopolysiloxane emulsions of this invention may also be used as binding agents for inorganic fibrous materials such as glass fibers, asbestos, rock and slag wool.

Furthermore, the aqueous organopolysiloxane emulsions of this invention can be used as additives for dispersions consisting of pure organic resins, such as polyvinyl acetate or polyacrylic acid ester dispersions and as an agent to impart hydrophobic properties to phenol resin-bonded mineral containing thermal insulation materials.

The aqueous organopolysilcxane emulsions of this invention may also be used as additives in inorganic coatings, such as sodium or potassium silicate and limewash paints.

The aqueous organopolysiloxane emulsions of this invention may be utilized as binding agents in aqueous coatings which are applied to, for example, wood, brick walls, metals, plastics or glass, in which the aqueous paint may contain pigments, including aluminum powder.

Also, the aqueous emulsions of this invention can be used as primers for organopolysiloxane elastomers.

Condensation catalysts or agents which promote adhesion of coatings obtained from these emulsions on the substrates on which they are applied, may be added to the emulsions of this invention up to the time of their utilization.

In the following examples, all parts and percentages are by weight unless otherwise indicated.

(a) The monomethylsiloxane containing ethyl groups which are bonded to silicon via oxygan used as organopolysiloxane (A) in the following examples was prepared in the following manner:

A mixture containing 10 mols of ethanol and 5.5 mols of water was added dropwise via a dropping funnel to a mixture consisting of 6 mols of methyltrichlorosilane and 400 g of toluene with constant stirring. Gaseous hydrogen chloride was released and the temperature of the contents in the reactor decreased considerably from the orignal 30° C. After the addition of the ethanol-water mixture had been completed, the resultant mixture was heated to 40° C. and a mixture consisting of ethanol, water and hydrogen chloride was distilled off at 20 hPa (absolute). The residual hydrogen chloride was neutralized with anhydrous sodium carbonate and thereafter the residual ethanol and water were distilled off at 30 hPa (absolute) at 120° C. The residue from the distillation was cooled and filtered. A clear, colorless liquid having a viscosity of 20 mPa.s at 23° C. was recovered. The resultant product has the general formula CH$_3$Si(OC$_2$H$_5$)$_{0.8}$O$_{1.1}$ This organopolysiloxane has a molecrlar weight of about 650 g/mol.

(b) The water-soluble organic acid salt and the organopolysiloxane having SiC-bonded radicals with basic nitrogen used in the following examales as emulsifier (B) was prepared in the following manner:

To a 1-liter, three-neck flask equipped with a stirrer, a dropping funnel and a reflux condenser was added a mixture consisting of 0.2 g potassium hydroxide in 4 g of methanol and 500 g of the organopolysiloxane whose preparation is described in Example (a) above, and 150 g of N-(2 aminoethyl-3-aminopropyl)trimethoxysilane (also known as gamma-aminoethylaminopropyltrimethoxysilane The resultant mixture was heated and refluxed for 6 hours, then allowed to cool to 30° C. and mixed with 2.5 ml of 10 percent aqueous hydrochloric acid. The volatile constituents were then removed by heating the mixture to 140° C. and then filtered. The resultant organopolysiloxane contained 2.9 percent by weight basic nitrogen. The salt was prepared by mixing 8 parts of this organopolysiloxane with 1 part glacial acetic acid.

EXAMPLE 1

About 7 parts of the organopolysiloxane whose preparation was described in Example (a) above were mixed with 3 parts of the organopolysiloxane salt, whose preparation was described in Example (b) above, with the aid of a high-speed stator-rotor stirrer at room temperature. The resultant mixture was mixed with water, using the same stirring apparatus, but at a low speed, until a creamy mass was formed, at which time additional water was added until an oil-in-water emulsion was obtained. A total of about 10 parts of water were added. The properties of the resultant emulsion were as follows:

| Centrifugal test: (1 hour at 4000 rpm) | No separation. | |
|---|---|---|
| Viscosity: | Upon completion. | 50 mPa.s at 23° C. |
| | After 7 days. | 50 mPa.s at 23° C. |
| | After 1 year. | 75 mPa.s at 23° C. |
| Particle size: | Upon completion. | 175 nm |
| | After 7 days. | 175 nm |
| | After 1 year. | 210 nm |

Immediately after its preparation, then 7 days later and 1 year later, the composition dries on a glass substrate at room temperature, forming a clear, hard film.

EXAMPLE 2

In this example, 1 part of the emulsion prepared in accordance with Example 1, was mixed with 15 parts of water. The resultant mixture was then used as mixing water for the preparation of a commercial-type plaster. After a specimen made from the said plaster had been placed in water at room temperature for a period of 2 hours, the specimen absorbed only 2 percent water based on its weight. Under similar conditions, a specimen whose mixing water did not contain any additive, absorbed 14 percent water based on its weight.

EXAMPLE 3

About 7 parts of the emulsion prepared in accordance with Example 1, were mixed with 50 parts of a commercially available aqueous lime-wash paint. After a coating prepared with this lime-wash paint had dried, a drop of water evaporated on the paint before it could penetrate it.

EXAMPLE 4

About 1 part of the emulsion prepared in accordance with Example 1 was diluted with 5 parts of water. At a voltage of 60 volt and over a period of 2 minutes, a steel plate affixed to the cathode of an electrophoresis apparatus used for electropainting was coated with a 100 micron film of said diluted emulsion. After it had been heated for 1 hour to 150° C., the film appeared to be highly water-repellent.

EXAMPLE 5

About 1 part of the emulsion prepared in accordance with Example 1 was diluted with 5 parts of water and sprayed onto 5 parts of rock wool at the rate of 1500 liters per hour. After it had dried, the treated rock wool was pressure-molded for 10 minutes at 200° C. There was no substantial change in color of the molded rock wool from that of the untreated rock wool. Molded rock wool specimens measuring 10 cm×10 cm×4 cm were then placed in water for 30 minutes and held 2 cm below the surface of the water. They were then placed on a grid on their narrow edge and the water was allowed to drop off for 5 minutes. The water absorption factors are shown in the table.

TABLE

| | Percent Water Absorption |
|---|---|
| Immediately after molding. | 0.1 |
| After moldings had been stored for 24 hours at 200° C. | 0.1 |
| After moldings had been stored for 24 hours at 260° C. | 0.4 |

What is claimed is:

1. An aqueous emulsion comprising (A) an organopolysiloxane containing aliphatic radicals that are bonded to silicon via oxygen, and has a molecular weight of at least 620 g per mol, represented by the formula

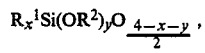

$$R^1_x Si(OR^2)_y O_{\frac{4-x-y}{2}},$$

where $R^1$ represents SiC-bonded monovalent organic radicals, $R^2$ represents monovalent aliphatic radicals, and x is 0, 1, 2 or 3, with an average of from 0.75 to 1.5, and y is 0, 1, 2 or 3, with an average of from about 0.2 to 2.0; (B) an emulsifier containing a salt of a water-soluble organic or inorganic acid, which is obtained by reacting a polysiloxane with a water-soluble organic or inorganic acid selected from the group consisting of hydrochloric acid, sulfuric acid, acetic acid, propionic acid and diethylhydrogenphosphate, in which the polysiloxane contains in addition to other siloxane units, siloxane units having monovalent SiC-bonded radicals with basic nitrogen of the formula

$$R^5_2 NR^6-$$

where $R^5$ is selected from the group consisting of hydrogen, alkyl and aminoalkyl radicals and $R^6$ is a divalent hydrocarbon radical, in an amount of at least 0.5 percent by weight of basic nitrogen, based on the weight of the polysiloxane, and up to 5 percent by weight of a water-soluble solvent or octanols, based on the weight of the emulsifier (B).

2. The aqueous emulsion of claim 1, wherein the emulsifier (B) is present in an amount of from 18 to 50 percent by weight, based on the weight of the organopolysiloxane (A).

3. The aqueous emulsion of claim 1, wherein the emulsion is free of a water-soluble organic solvent or octanols.

4. The aqueous emulsion of claim 2, wherein the emulsion is free of a water-soluble organic solvent or octanols.

* * * * *